Nov. 15, 1966 J. M. ROBBINS 3,285,659
SEAT BELT ESCUTCHEON

Filed Dec. 4, 1964

INVENTOR
JAMES M. ROBBINS

BY *Allen M. Krass*
ATTORNEY

Nov. 15, 1966   J. M. ROBBINS   3,285,659
SEAT BELT ESCUTCHEON

Filed Dec. 4, 1964   2 Sheets-Sheet 2

INVENTOR
JAMES M. ROBBINS

BY   *Allen M. Krass*
ATTORNEY

United States Patent Office 3,285,659
Patented Nov. 15, 1966

3,285,659
SEAT BELT ESCUTCHEON
James M. Robbins, Royal Oak, Mich., assignor, by mesne assignments, to Jim Robbins Seat Belt Co., Royal Oak, Mich., a corporation of Delaware
Filed Dec. 4, 1964, Ser. No. 416,014
5 Claims. (Cl. 297—385)

This invention relates to improvements in a protective cover or escutcheon for safety seat belts which may be applied to the juncture between the ends of the belt webbing and various fastener elements employed with the belt.

United States patent application, Serial Number 354,016, filed by me on March 23, 1964 and now Patent No. 3,175,862, discloses a protective covering member which may be applied to the juncture between the ends of the webbing members of seat belts and the hardware elements such as buckles and floor fasteners. These protective coverings are adapted to be used wherever the end of the webbing member is passed through an aperture in the hardware member and then rejoined to the main belt section, normally by a sewn seam. The escutcheon is formed of a flexible plastic and includes a tubular section which is adapted to surround the belt at the seam, and a tongue member which extends from one end of the tubular section, passes through the aperture in the hardware member so as to surround the belt loop and has its extreme end attached to the tubular section, preferably by being tucked between the tubular section and the belt loop. These escutcheons are low in cost and easy to apply and provide a number of advantages such as enhancing the appearance of the belt and eliminating the necessity for a fine sewn joinder at the belt loop; these advantages being pointed out in detail in the previously noted application. As the result, escutcheons made in accordance with my invention have gained a wide commercial acceptance and are provided as original equipment on a sizable percentage of the automobiles manufactured in this country.

However, the escutcheons disclosed in my previous application are susceptible to becoming dislodged from the belt end as the result of forces exerted upon them in use. This is particularly true of those embodiments of the escutcheon wherein the extreme end of the tongue is retained by tucking it between the tubular section of the escutcheon and the surface of the belt. When forces are exerted on the belt in such a manner as to cause the opposed sides of the tubular section of the escutcheon to separate from one another, the tongue end is apt to slide out of the tubular section so as to undo the escutcheon. My previous application disclosed a raised ridge extending across the width of the tongue end of the side of the tongue which faces the belt when it is tucked into the tubular section. This ridge was adapted to extend beyond the sewn belt joinder so that it would catch on the webbing end as the tongue was retracted from the tubular section and thereby prevent accidental opening of the escutcheon. It has been found in practice that this ridge does not completely solve the problem of the escutcheon becoming accidentally opened as the relatively soft belt end allows the necessarily shallow ridge to ride over it if any reasonable force is exerted on the tongue.

Accordingly, the present invention has as its primary object to provide an escutcheon for a seat belt, of the type having a flat tubular section and an extending tongue which is adapted to be looped through a hardware member aperture and then tucked into the tubular section, wherein a configuration is provided on the end of the tongue member which will largely eliminate the problem of the tongue becoming undone as the result of the pressures exerted on the escutcheon in its normal use.

The invention broadly resides in the provision of a raised lip formed across the width of the end of the escutcheon tongue and the provision of one or more wings which extend outwardly from the outer sides of the lip and cover a portion of the outside of the tubular section. A specific configuration of these end members is such as to prevent accidental disengagement of the tongue but to allow very simple assembly thereof, and relatively easy intentional opening thereof.

The following detailed description discloses three preferred embodiments of the invention. Each of the embodiments incorporates a lip extending transversely across the tongue on the extreme end thereof of the side which is outwardly extended when the escutcheon is assembled. The three embodiments differ in the manner of the formation of the wings on top of the lip. In one embodiment, the wings are formed outwardly from the top of the side edges of the lip and interact with notches formed in the end of the tubular section. In another embodiment the wings are raised above the ends of the lip and extend over the unnotched ends of the tubular section. In the third embodiment, the single wing extends from the lip parallel to the tongue member so that the end of the tubular section may be engaged between the lip and the tongue member.

Other advantages, applications, and objects of the present invention will be made clear by the following detailed description of these three embodiments. The description makes reference to the accompanying drawings in which.

Figure 1:
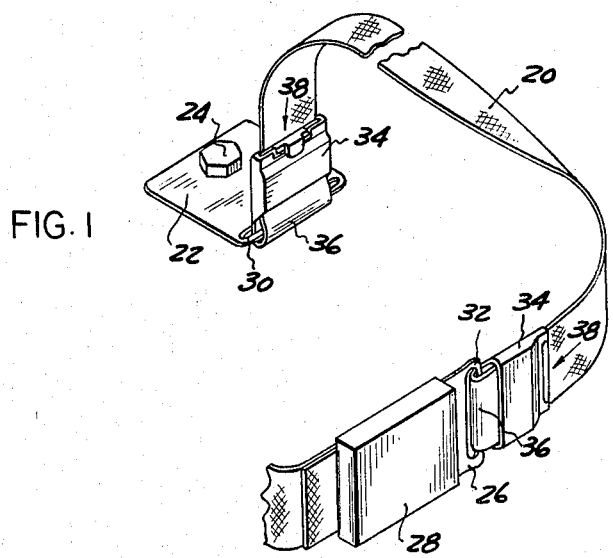
FIGURE 1 is a perspective view of a section of a safety belt with one end attached to a floor support and the other end attached to a buckle member, and having protective escutcheons, which may be any of the three types subsequently disclosed, protecting its joinder to the hardware members.
Figure 2:
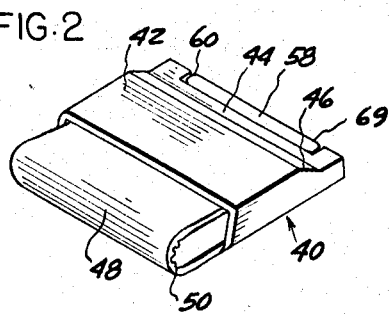
FIGURE 2 is a perspective view of an escutcheon formed in accordance with the first embodiment of the invention, shown in a closed position.

Referring to the drawings, any of the embodiments of the invention which will be subsequently described are adapted to be employed with a seat belt which may be of the type shown in FIGURE 1 wherein a woven webbing member 20 is joined at one end to a floor fastener 22, which is in turn retained to the floor of the vehicle by a bolt 24, and at the other end to a male buckle member 26 adapted to be joined to a female buckle member 28. The floor plate 22 has a slot 30 formed therein and a similar slot 32 is formed in the male buckle member 26. The webbing member is adapted to be joined at its ends to the respective hardware members by passing the ends through the apertures 30 and 32 and sewing the ends to the main belt section so as to form a loop therein. The purpose of the escutcheons are to surround and protect these loops. The escutcheons, as generally shown in FIGURE 1, are preferably formed of a flexible plastic and comprise tubular sections 34 which surround the loops and tongue sections 36 which extend from one of the sides of the tubular section, pass over the belt loops, through the apertures 30 and 32, and have their extreme ends tucked between the other sides of the tubular sections and the belt loops. As has been noted, the primary object of the present invention is to provide some configuration generally indicated at 38 on the end of the escutcheon tongue, which configuration will so interact with the end of the belt and the tubular section to prevent accidental unlocking of the escutcheon.

The first embodiment of the invention is disclosed in FIGURES 2–5. The escutcheon member, shown in a different attitude in each of these figures, includes a tubular section generally indicated at 40 which has a wide section 42 joined to a narrow, relatively small end section 44 by a sloped wall 46. The tubular sections 42 and 44 are generally rectangular in shape and have a width slightly greater than the width of the webbing section 20. The widened section 42 is adapted to be slipped over the sewn joinder loop in the belt end while the narrower section 44 is adapted to be disposed over the single thickness of the belt webbing beyond the sewn joinder. A tongue member 48 is formed integrally with the tubular section and extends from one edge of the wide section 42 opposite to that which joins to the narrow section 44.

The tongue 48 has a plurality of corrugations 50 extending across its width approximately ⅓ of its length from the joinder with the tubular section 40. The corrugations 50 allow the tongue to be easily bent so as to conform with the shape of the loop. The sides of the tongue taper inwardly slightly adjacent to the extreme end as at 52 so that the end has a width less than that of the interior passage of the tubular section 40. A slot 54 is formed across the center of the width between the sloped edges 52 so as to give greater flexibility to the extreme end of the tongue. A low ridge 56 extends across the width of the tongue 52 just short of the end. This ridge is adapted to engage the extreme end of the belt webbing section beyond its joinder with the main section to aid in securing the tongue within the tubular section. The ridge 56 is formed on the side of the tongue which contacts the belt loop when the tongue is inserted in the tubular section.

The lip is formed transversely across the entire width of the extreme end of the tongue section. A short section 59, slightly narrower than the tongue at the ridge 56 connects the lip to the ridge. The lip 58 is preferably of a height which at least equals that of the thickness of the tongue section. It extends normally outward from the tongue on the opposite side of the tongue from the ridge 56 and therefore it is directed outwardly from the belt loop when the tongue is in its closed position. A pair of wings 60 extend transversely outward from the opposite sides of the edge of the lip. These wings have a thickness equal to about ½ of the height of the lip. They extend outwardly so that their total width is approximately equal to that of the thickness of the tongue at the ridge 56.

Figure 5:
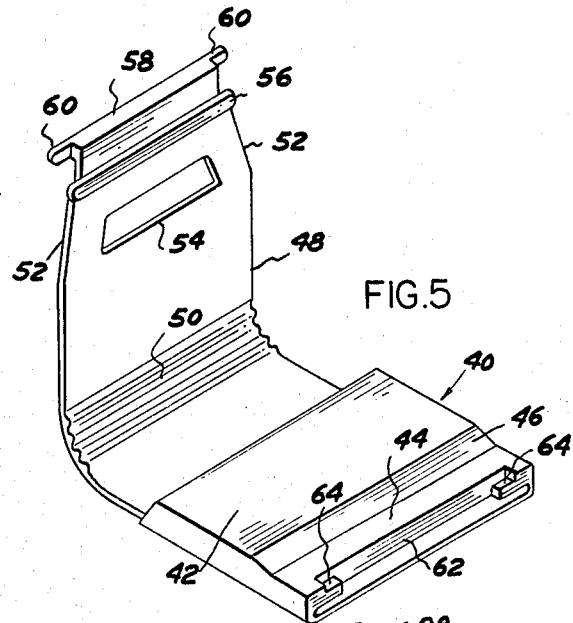
FIGURE 5 is a perspective view of the escutcheon of FIGURE 2 in an opened position.
Figure 8:
FIGURE 8 is an end view of the escutcheon of FIGURE 6.
Figure 9:
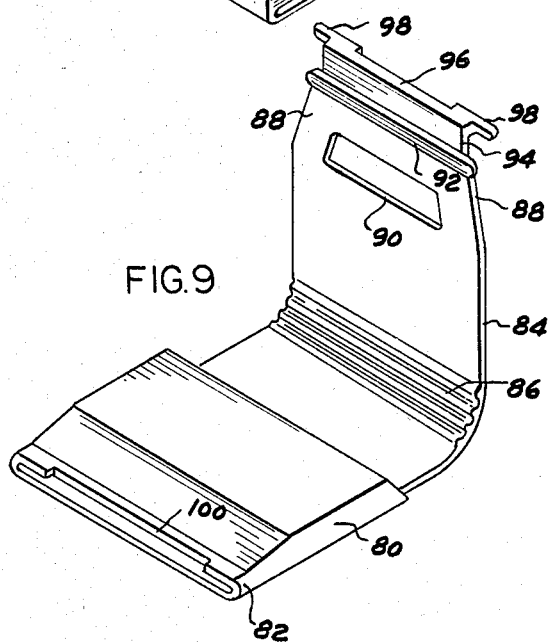
FIGURE 9 is a perspective view of the escutcheon of FIGURE 6 in an opened position.

The narrow section 44 of the tubular section 40 has a configuration adapted to receive the lip 58 and the wings 60. The top edge of the narrow section 44 (as seen in FIGURE 5) is cut back to form a center aperture 62 having a width equal to that of the extreme tongue section. The upper sides of the end of the tubular section, adjacent to the aperture 62 are formed with square notches 64 of a configuration adapted to receive the wings 60.

Figure 3:
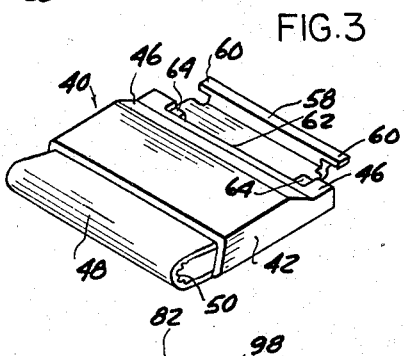
FIGURE 3 is a perspective view of the escutcheon of FIGURE 2 shown with the end of the tongue extending beyond the tubular section.
Figure 6:
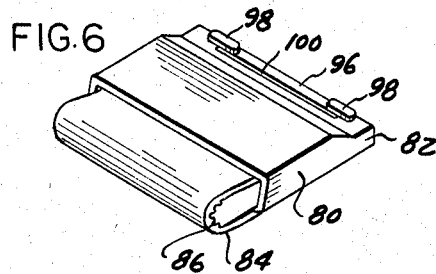
FIGURE 6 is a perspective view of an escutcheon formed in accordance with the second embodiment of the invention, shown in a closed position.
Figure 7:
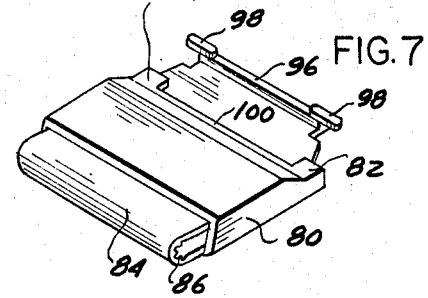
FIGURE 7 is a perspective view of the escutcheon of FIGURE 6 with its tongue extending beyond the end of the tubular section.

The escutcheon of FIGURES 2–5 is assembled to a belt section by extending the widened section 42 of the tubular section over the sewn joinder and extending the tongue through an aperture of a hardware member so as to surround the loop. The end of the tongue is then tucked into the tubular section and extended through, and past the narrow end thereof as seen in FIGURE 3. The tongue is then retracted and raised so that the wings 60 fit within the notches 64. In this position if forces are exerted on the belt or escutcheon which cause the opposed sides of the tubular section to move away from one another, the tongue end is still not free to move through and out of the tubular section because the wings 60 are retained in the notches 64. In order to free the belt end it is necessary to push the tongue forward until the wings are beyond the notches 64 and then lower the tongue into the central aperture of the tubular section and then remove it. The probability of accidental forces first pushing the tongue forward, then lowering it, and then retracting it, are small.

The top surface of the lip 58 and the narrow section 44 of the tubular section 40 are flush when the escutcheon of FIGURES 2–5 is in its assembled position.

The escutcheon of FIGURES 6–9 is similar to that of the escutcheon of FIGURES 2–5, incorporating a wide tubular section 80, a narrowed tubular section 82, an elongated tongue 84 extending from the wide tubular section and corrugations 86 formed across the width of the interior of the tongue member 84. The tongue 84 has sloped sides 88 and a slot 90 formed between the sloped sides. A ridge 92 extends across the width of the narrow section of the tongue in one direction and a narrower end configuration 94 carries a lip 96 which extends outwardly in the other direction. This embodiment differs from the first one in that a pair of wings 98 are superimposed across the top of the lip 96 and the narrow tubular section 82 is simply formed with an elongated notch 100 at its upper edge. No equivalents of the notches 64 are present.

When the tongue is assembled the wings 98 extend over the tops of the sides of the narrowed section 82 thus locking the tongue in place against retracting forces.

Figure 10:
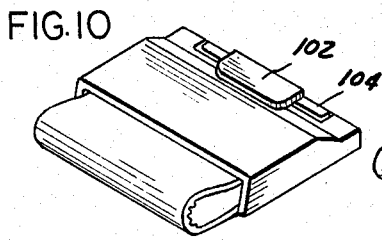
FIGURE 10 is a perspective view of an escutcheon formed in accordance with the third embodiment of the invention, in a closed position.
Figure 11:
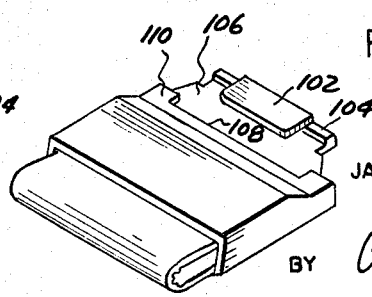
FIGURE 11 is a perspective view of the escutcheon of FIGURE 10 with its tongue extending beyond the tubular section.
Figure 4:
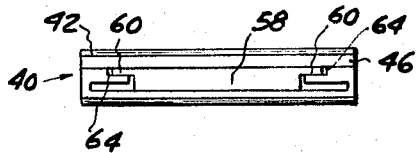
FIGURE 4 is an end view of the escutcheon of FIGURE 2.
Figure 12:
FIGURE 12 is an end view of the escutcheon of FIGURE 10.
Figure 13:
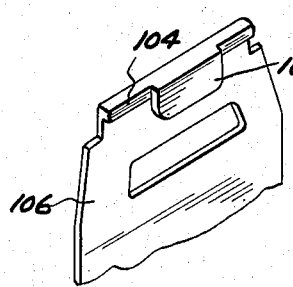
FIGURE 13 is a perspective view of the end of the tongue section of the embodiment of FIGURE 10.

In the third embodiment of the invention, disclosed in FIGURES 10–13, the structure is identical to that of the second embodiment except that the wings 98 are replaced by a single wing 102 which extends from the center of the lip 104 in the direction parallel to the extension of the end of the tongue member 106 of this embodiment. When the unit is closed, as shown in FIGURES 10 and 12, the lip 104 extends into an aperture 108 formed across the center of the width of the narrow tubular section of the belt 110. The lip 102 then extends back over the center section of the thin tubular member and again locks the tongue in place against accidental displacement by tension exerted on the tongue.

Having thus described my invention, I claim:

1. A protective cover for the attachment between the end of a looped seat belt webbing and a hardware member having the loop passing through an aperture therein, said protective cover including a tubular section adapted to surround the webbing at the joinder of the loop and a flexible tongue, integral with and extending from one edge of the tubular section and operative to be passed over the belt loop, through the aperture in the hardware member, and to have its extreme end tucked between the tubular section and the webbing, said tongue member having a lip on its extreme end which extends transversely across the tongue end and a wing member attached to said lip and extending parallel to the extension of the tongue, said wing being adapted to engage the tubular section when the cover is in a closed position in such a manner whereby it is necessary to first extend the end of the tongue member beyond the end of the tubular section and then move the end of the tongue member normally to the plane of the tubular section before withdrawing the tongue end from the tubular section.

2. The protective covering of claim 1 in which the end of the tongue member is narrower than the tongue member at its line of contact with the tubular section and the wing extends transversely outward from the lip to a total width less than that of the tongue at its connection with the tubular section.

3. The protective covering of claim 1 wherein the wing engages a notch in the tubular section when the covering is closed so that the exposed surface of the wing is flush with the adjacent surface of the tubular section.

4. A protective covering for the connection between a seat belt webbing and a hardware member having an aperture therein through which the webbing end passes, said end being then rejoined to the main belt section to form a loop, said protective covering including a flat tubular section having an aperture therethrough of sufficient size to accommodate said webbing, said tubular section being disposed over the extreme end of the webbing, and a flexible tongue integral with and extending from one end of one flat side of the tubular section, passing over the looped belt end and through the aperture in the hardware member and having its extreme end tucked between the tubular section on the side opposite to that which is integral with the tongue member and the webbing section, said tongue member having a narrowed end with raised lip extending transversely across said end in such a direction as to face outwardly from said webbing when the cover is in a closed position, said lip having a wing superimposed thereon at its edge separated from said tongue, said wing being adapted to engage with the tubular section when the cover is in a closed position such that before the tongue can be retracted from the tubular section it must be moved in the opposite direction to disengage the wing from the tubular section.

5. The structure of claim 4, wherein the wing extends from the end of the lip opposite to that contacting the tubular section in a direction paralled to the extension of the tongue.

References Cited by the Examiner

UNITED STATES PATENTS

| 967,664 | 8/1910 | Peterson | 24—265 |
|---|---|---|---|
| 1,661,821 | 3/1928 | Hagelin | 24—183 |
| 2,129,494 | 9/1938 | Dinhofer | 24—265 |
| 2,501,385 | 3/1950 | Garreau | 24—265 |
| 2,648,114 | 8/1953 | Holtz et al. | 24—265.1 |
| 2,809,142 | 8/1957 | Beeber et al. | 24—265.1 X |
| 2,861,615 | 11/1958 | Kimmel | 150—12 |
| 2,862,269 | 12/1958 | Reiter | 150—12 X |
| 3,000,069 | 9/1961 | Shears | 24—230 |
| 3,030,685 | 4/1962 | Reiter | 150—12 X |
| 3,039,506 | 6/1962 | Reiter | 150—12 |
| 3,046,056 | 7/1962 | Greene et al. | 297—385 |
| 3,175,862 | 3/1965 | Robbins | 297—385 |

FOREIGN PATENTS 177,274   1/1954   Austria.

FRANK B. SHERRY, *Primary Examiner.*

JAMES T. McCALL, *Examiner.*